United States Patent [19]

Ikeda et al.

[11] Patent Number: 4,925,817

[45] Date of Patent: May 15, 1990

[54] DIELECTRIC CERAMIC COMPOSITION

[75] Inventors: Masaaki Ikeda; Wataru Takahara, both of Tokyo, Japan

[73] Assignee: TDK Corporation, Tokyo, Japan

[21] Appl. No.: 376,998

[22] Filed: Jul. 7, 1989

[30] Foreign Application Priority Data

Sep. 20, 1988 [JP] Japan .................................. 63-235649

[51] Int. Cl.$^5$ .............................................. C04B 35/46
[52] U.S. Cl. .................................... 501/138; 501/137; 501/139
[58] Field of Search ........................ 501/137, 138, 139

[56] References Cited

FOREIGN PATENT DOCUMENTS 61-36170 2/1986 Japan .
61-250905 11/1986 Japan .

Primary Examiner—Mark L. Bell
Assistant Examiner—Anthony J. Green
Attorney, Agent, or Firm—Oblon, Spivak, McClelland, Maier & Neustadt

[57] ABSTRACT

A non-reducible dielectric ceramic composition comprising barium titanate as the main component, which contains an additive expressed by the formula $Ba_\alpha Ca_{1-\alpha}SiO_3$ ($0.43 \leq \alpha \leq 0.62$) in an amount of from 0.1 to 6 mol parts per 100 mol parts of the barium titanate.

5 Claims, No Drawings

DIELECTRIC CERAMIC COMPOSITION

The present invention relates to a non-reducible dielectric ceramic composition. Particularly, it relates to a dielectric ceramic composition which can be sintered at a relatively low temperature to provide a sintered dielectric ceramic product having electric characteristics such as a small dielectric loss, a high specific resistance and a high dielectric constant, the variation of which is only slight with the change of temperature and with the passage of time.

A dielectric ceramic composition for providing a sintered dielectric product having electric characteristics such as a small dielectric loss and a high dielectric constant, the variation of which is only slight with the change of temperature, can be prepared, for example, by adding cobalt niobate, tantalum niobate, samarium niobate, bismuth stannate, bismuth zirconate, tantalum zirconate, niobium zirconate or the like to barium titanate. A laminated ceramic capacitor of small size and large capacity can be prepared by using these dielectric materials.

Such a laminated ceramic capacitor (see, for example, Japanese Examined Patent Publication No. 39049/1981) is widely used as an IC circuit element for a communications apparatus, an electronic computer, a television receiver or the like.

Heretofore, methods for preparing laminated ceramic capacitors are generally classified into a printing method and a sheeting method.

The printing method comprises preparing a slurry of a dielectric composition, printing the slurry in a predetermined pattern, for example, by screen printing, drying the printed pattern and then printing an electrode paste thereon. After drying the printed electrode paste, the lamination of a dielectric layer and an internal electrode layer is effected by repeating the step of printing another slurry of a dielectric composition.

The sheeting method comprises preparing a dielectric sheet, for example, by a doctor brade method, printing an electrode paste thereon, overlaying a plurality of such sheets one on another and finally subjecting them to thermocompression bonding to obtain a laminate.

The laminate prepared by one of these methods is sintered at a temperature of from about 1,250° C. to 1,400° C. in natural atmosphere to prepare a sintered product, and the internal electrode is connected with an external lead electrode by baking, thus preparing a layered ceramic capacitor.

In such a case, the dielectric substance and the internal electrode as an electrode for the capacitor are sintered at the same time, and therefore the starting material used for the internal electrode should satisfy the requirements that it forms an electrode under the temperature condition, at which the dielectric substance is sintered, and that it is not oxidized during being heated at the above temperature in natural atmosphere nor reacts with the dielectric substance. Heretofore, noble metals such as platinum and palladium have been mainly used as the electrode material since they satisfy the above-mentioned requirements. However, although these noble metals are very stable, they are expensive, and from 20 to 50% of the total cost of a laminated ceramic condenser is occupied by the prices of these materials, thus resulting in the rise in the manufacturing cost of the total apparatus. Therefore, there was an attempt to use an inexpensive base metal as the electrode material.

However, when a base metal such as nickel is used, it is oxidized during being heated in an oxidizing atmosphere and reacts with a dielectric substance, whereby it is unable to form an electrode.

To prevent such oxidation of nickel, if sintering is conducted in a neutral or reducing atmosphere, a dielectric substance will be reduced and its specific resistance will be so low that it will no longer be useful as a dielectric material for a capacitor.

In order to solve these problems, the present Applicant has previously proposed non-reducible dielectric ceramic compositions (Japanese Unexamined Patent Publication Nos. 36170/1986 and 250905/1986).

With these conventional dielectric ceramic compositions, the electric properties such as insulation resistance, dielectric loss and dielectric constant do not substantially vary with the change of temperature. However, they have a problem that their dielectric constants substantially vary with time when a DC bias is applied.

Thus, an object of the present invention is to provide a dielectric ceramic composition which is capable of providing a product having a high dielectric constant and a high specific resistance and which can be sintered at a relatively low temperature in a neutral or reducing atmosphere without lowering the specific resistance of the product. It further satisfies the requirements that the variation of the dielectric constant of the formed dielectric substance is small with the passage of time and with the change of temperature and that the dielectric loss is small.

In order to achieve the above-mentioned object, the present invention provides a non-reducible dielectric ceramic composition comprising barium titanate as the main component, which contains an additive expressed by the formula $Ba_\alpha Ca_{1-\alpha} SiO_3$ ($0.43 \leq \alpha \leq 0.62$) in an amount of from 0.1 to 6 mol parts per 100 mol parts of the barium titanate.

The composition of the present invention may further contain other additives to improve various properties of the dielectric ceramic composition. For example, $SrTiO_3$, $MnCO_3$ and $Nb_2O_5$ powders may be incorporated in amounts of from 0.1 to 30 mol parts, from 0.01 to 20 mol parts and from 0.0001 to 11 mol parts, respectively, per 100 mol parts of the barium titanate. Sr serves to improve the temperature characteristics, Mn serves to prevent the reduction, and Nb serves to improve the dielectric constant.

The present invention will be described in detail with reference to typical Examples. However, it should be understood that the present invention is by no means restricted to such specific Examples.

EXAMPLES

Starting materials, $BaCO_3$, $CaCO_3$ and $SiO_2$ are weighed so as to provide an additive having a composition after sintering of the formula $Ba_{60}Ca_{1-\alpha}SiO_3$ wherein $\alpha$ indicates the value as shown in Table 1, and they are mixed in a mill for one hours. The mixture is melted at 1,350° C. in an alumina crucible, and the melt is then quenched in ice. Thereafter, the quenched solid is pulverized to obtain glass powder, as the additive of the present invention.

The glass powder thus obtained is then added to barium titanate ($BaTiO_3$) powder in the amount as shown in Table 1. (The amount of additive in Table 1 is expressed by mol parts per 100 mol parts of BaTiO$_3$). Further, 3 mol parts of SrTiO$_3$, 2 mol parts of MnCO$_3$, 0.1 mol part of Nb$_2$O$_5$ and 0.1 mol part of SiO$_2$, per 100 mol parts of the BaTiO$_3$ powder, are added thereto. They are mixed in ice for 16 hours, and then dehydrated and dried to obtain a powder.

Here, Sr has a function to improve the temperature characteristics, Mn has a function to prevent the reduction, and Nb has a function to improve the dielectric constant. These functions of the additives are disclosed e.g. in the above-mentioned Patent Publications by the present Applicant.

A suitable amount of an organic binder is added to the above prepared powder, and the resultant mixture is press-molded into a disk of 16.5 mm$\phi \times$0.6 mm. On both sides of the molded product, a paste having nickel powder dispersed in an organic vehicle is coated by screen printing. The coated disk is then placed on a zirconia plate, and is heated to 500° C. in a sagger in natural atmosphere, thereby burning off the organic binder. Thereafter, the disk is sintered at a temperature of from 1,180° C. to 1,300° C. for 2 hours in N$_2$ or N$_2$+H$_2$ to obtain a dielectric ceramic product.

The product samples thus obtained are subjected to measurements of relative dielectric constant ($\epsilon_s$), dielectric loss (tan $\delta$, %), capacity change rate with the variation of temperature ($\Delta$C/C, %) and capacity change rate with the passage of time ($\Delta C_{RE}$/C, %) when a DC bias Of 1.5 KV/mm is applied at 60° C. for 500 hours. The results are shown in Table 1.

Furthermore, the samples of the present invention can be prepared by sintering at a relatively low temperature, and their dielectric loss is small.

The significance for limitation of the respective numerical values in the present invention will now be explained.

If the value $\alpha$ in the formula Ba$_\alpha$Ca$_{1-\alpha}$SiO$_3$ is $\alpha<0.43$ or $\alpha>0.62$, it is necessary to heat the additive to a high temperature of at least 1,350° C. for vitrification, such being impractical.

If the amount of Ba$_\alpha$Ca$_{1-\alpha}$SiO$_3$ is less than 0.1 mol %, no adequate effect will be obtained for improving the capacity change rate with the passage of time ($\Delta C_{RE}$/C) (see, for example, Sample Nos. 3 and 4 in Table 1). On the other hand, if the amount exceeds 6.0 mol %, the relative dielectric constant ($\epsilon_s$) tends to be low, such being impractical (see, for example, Sample No. 11 in Table 1).

In the Examples of the present invention, the Ba$_\alpha$Ca$_{1-\alpha}$SiO$_3$ additive is added in a glass state. But it may be added in a crystalline state (Sample No. 14) by calcining a mixture of CaCO$_3$, BaCO$_3$ and SiO$_2$ having the above specified composition at a temperature of from 900° C. to 1,200° C., to obtain certain effects for improving $\Delta C_{RE}$/C. However, as can be seen from the comparison of Sample Nos. 8 and 14 in Table 1, it is more effective to add the additive in a glass state than in a crystalline state.

According to the present invention, a dielectric ceramic product has good electric properties even when prepared by sintering in a neutral or reducing atmosphere. Particularly, it is possible to obtain a product having a small capacity change rate when a DC bias of 1.5 KV/mm is applied at 60° C. for 500 hours. Thus it is possible to prepare, e.g. a laminated ceramic capacitor by using an electrode made of an inexpensive base metal such as nickel, from the dielectric ceramic composition of the present invention.

TABLE 1

| Sample No. | $\alpha$ | Amount of additive | Sintering temperature (°C.) | $\epsilon_s$ | tan $\delta$ (%) | $\Delta$C/C (%) (−55° C.) | $\Delta$C/C (%) (125° C.) | $\Delta C_{re}$/C (%) | Note |
|---|---|---|---|---|---|---|---|---|---|
| *1 | 0.40 | — | — | — | — | — | — | — | Hardly meltable |
| *2 | 0.65 | — | — | — | — | — | — | — | Hardly meltable |
| *3 | — | 0 | 1,200 | 3,800 | 0.5 | +3.0 | +11.0 | −12.0 | |
| *4 | 0.58 | 0.05 | 1,200 | 3,700 | 0.5 | +3.0 | +10.0 | −12.0 | |
| 5 | 0.58 | 0.12 | 1,200 | 3,700 | 0.5 | +3.0 | +10.0 | −10.0 | |
| 6 | 0.58 | 0.50 | 1,200 | 3,200 | 0.5 | +4.0 | +9.0 | −8.0 | |
| 7 | 0.58 | 1.0 | 1,200 | 3,000 | 0.5 | +6.0 | +7.0 | −4.0 | |
| 8 | 0.58 | 2.0 | 1,200 | 2,800 | 0.5 | +8.0 | +7.0 | −4.0 | |
| 9 | 0.58 | 4.0 | 1,200 | 2,600 | 0.5 | +6.0 | +1.0 | −3.0 | |
| 10 | 0.58 | 6.0 | 1,200 | 2,400 | 0.5 | +2.0 | +0.5 | −2.0 | |
| *11 | 0.58 | 8.0 | 1,200 | 1,800 | 0.5 | +1.0 | −1.0 | −2.0 | |
| 12 | 0.61 | 1.0 | 1,200 | 3,000 | 0.5 | +3.0 | +6.0 | −4.0 | |
| 13 | 0.45 | 1.0 | 1,200 | 3,000 | 0.5 | +3.0 | +7.0 | −4.0 | |
| 14 | 0.58 | 2.0 | 1,200 | 2,800 | 0.5 | +8.0 | +8.0 | −7.0 | Calcined at 1,100° C. |

In this Table 1, the samples with asterisk (*) are outside the scope of the present invention, and they are presented for comparison with the Examples of the present invention. That is, Sample Nos. 1 to 3 represent Comparative Examples wherein the value $\alpha$ in the formula Ba$_\alpha$Ca$_{1-\alpha}$SiO$_3$ is outside the scope of the present invention. With regard to Sample Nos. 4 and 11, the amount of Ba$_\alpha$Ca$_{1-\alpha}$SiO$_3$ added is outside the scope of the present invention. Sample No. 3 is within the scope of the Japanese Patent Application No. 89999/1985.

As can be seen from Table 1, the samples of the present invention produce only a small change in relative dielectric constant at a temperature ranging from −55° C. to 125° C., and have a high relative dielectric constant and a high specific resistance at normal temperature. Besides, the change rate of capacity with the passage of time is small, i.e. within ±10% when a DC bias of 1.5 KV/mm is applied at 60° C. for 500 hours. Fur-

We claim:

1. A non-reducible dielectric ceramic composition consisting essentially of barium titanate as the main component and an additive expressed by the formula Ba$_\alpha$Ca$_{1-\alpha}$SiO$_3$ (0.43$\leq \alpha \leq$0.62) in an amount of from 0.1 to 6 mol parts per 100 mol parts of the barium titanate.

2. The composition according to claim 1, wherein said additive expressed by the formula Ba$_\alpha$Ca$_{1-\alpha}$SiO$_3$ (0.43$\leq \alpha \leq$0.62) is in a glass state.

3. The composition according to claim 1, which further consists essentially of at least one of Sr in amounts of from 0.1 to 30 mol parts, Mn in amounts of from 0.01 to 20 mol parts, and Nb in amounts of from 0.0001 to 11 mol parts.

4. The composition according to claim 2, which further consists essentially of at least one of Sr in amounts of from 0.1 to 30 mol parts, Mn in amounts of from 0.01 to 20 mol parts, and Nb in amounts of from 0.0001 to 11 mol parts.

5. A non-reducible dielectric sintered ceramic composition consisting essentially of the composition of claim 1.

* * * * *